A. RUNSTETLER,
Assignor, by mesne assignments, to DEERE & MANSUR COMPANY.
Convertible Corn-Planter.
No. 8,614. Reissued Mar. 11, 1879.
FIG. I.
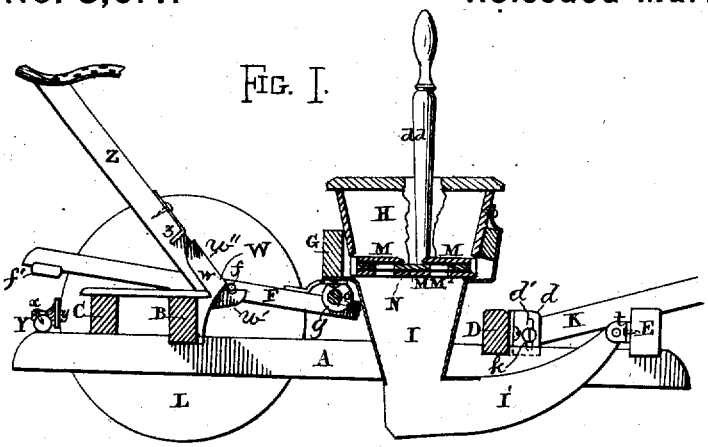
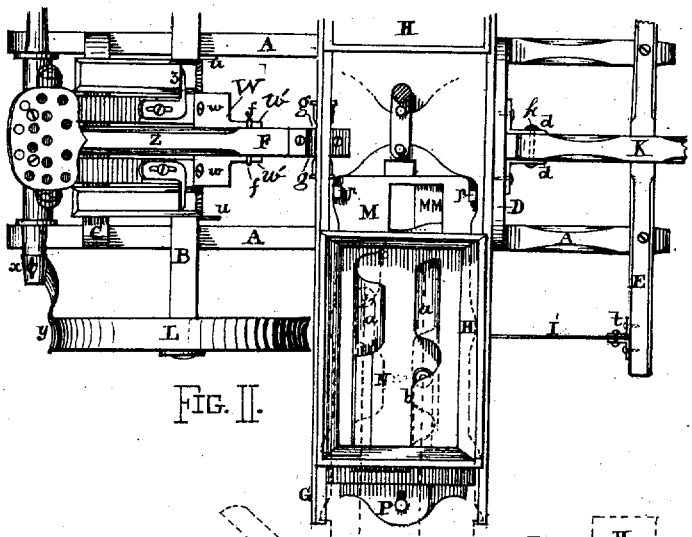
FIG. II.
FIG. IV.
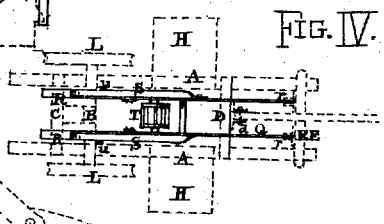
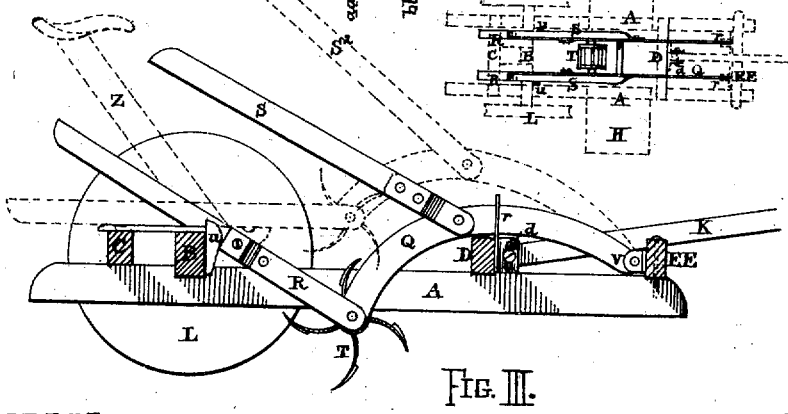
FIG. III.
WITNESSES:
F. B. Brock,
D. G. Stuart
INVENTOR
A. Runstetler,
By W. B. Richards.
ATTORNEY.
N. PETERS, PHOTO-LITHOGRAPHER, WASHINGTON, D. C.

UNITED STATES PATENT OFFICE.

ANDREW RUNSTETLER, OF MOLINE, ILLINOIS, ASSIGNOR, BY MESNE ASSIGNMENTS, TO DEERE & MANSUR COMPANY, OF SAME PLACE.

IMPROVEMENT IN CONVERTIBLE CORN-PLANTERS.

Specification forming part of Letters Patent No. 116,493, dated June 27, 1871; Reissue No. 8,614, dated March 11, 1879; application filed February 4, 1879.

*To all whom it may concern:*

Be it known that I, ANDREW RUNSTETLER, of Moline, in the county of Rock Island and State of Illinois, have invented certain new and useful Improvements in Convertible Corn-Planters; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1 is a side elevation of a corn-planter embodying my invention. Fig. 2 is a top-plan view, partly broken away. Fig. 3 is a side elevation of corn-stalk cutter, as combined with the frame of planter. Fig. 4 is a plan view of same.

This invention relates to corn-planters; and consists, first, in the combination, with a corn-planter having a rear frame carried on wheels, with side bars extended forward and hinged or journaled to the forward end of a frame carrying the cutters and seed-boxes, of a draft-pole adjustably attached to said rear frame, for the purpose of regulating the depth of planting; second, in a shoe cast or formed with projections for supporting the driver's seat, and other projections which have bearings for the fulcrums of the lever for raising and lowering the forward frame.

The invention further consists in improvements in the construction and combination of parts hereinafter fully described, and set forth in the claims hereto annexed.

Referring to the drawings by letters, the same letter indicating the same part in the different views, A A are the side beams of the planter-frame, which are strengthened by connecting cross-pieces C D E. B is the axle. The cross-piece D is a short distance back of the front of the planter, and has projecting from its front side clevises or plates *d d*, each plate *d* having a perpendicular slot, *d'*. The heel or rear end of the tongue K rests between the plates *d*, and by means of a bolt, *k*, which passes through the slots *d'*, the tongue may be adjusted higher or lower at its front and rear ends, its central portion resting on the bar E, as shown in the drawings.

E is a movable bar across the forward end of the frame, and bolted to the latter; and to the bar E the clevises *t t* are attached to which clevises the forward ends of the runners I' I' are hinged. F is a lever for raising the runners, and is pivoted at *g* to the box-bar G, and, passing to the rear, terminates in a cross foot-board, *f'*. The lever F is pivoted at its mid-length by studs *f* in two arms, *w'*, of a cast-iron shoe, W, which is bolted to the axle B, and, in addition to the two arms *w'*, for supporting the lever F, has also arms *w''*, which support the bar Z, on which the driver's seat is carried.

H is the corn or dropper box; I, the chute or tube of the runners; I', the runners; K, the tongue adjusted to clevis *d*, as above described; L, the wheels; M, the upper plate of the sliding part of the cut-off, *a a* being the cut-offs proper, whose front ends are rounded, so as not to cut or damage the corn, and hollowed out beneath for a similar purpose. *b b* are the projecting elbows of the plate, which follow their respective cut-offs *a a*, pushing the corn in the proper holes *e e* in the stationary plate N; M', the lower plate of the sliding part of the cut-off, called the "slide," of similar size, and fastened to the upper plate, M, by means of screws at the sides, and steadied by means of the dogs or clamps *p* at the corners. This plate has two holes pierced in it at *m m*, where the dotted lines indicate them. They are in a line with those in the stationary plate N. The sliding dropper-plates M M' M' are united from either side of the machine by a bar, and operated by a lever, *d*, in the ordinary manner. The seed-cups or holes in the plate N are adjustable in size by means of the slide P. Y is an adjustable-roller scraper-rod, carrying at either end a scraper for cleaning the wheels. *z z* are adjustable foot-rests attached to the bar Z, and can be set to any height by means of bolts and slots.

It will be seen from the drawings that adjusting the forward end of the tongue higher will cause the planter to run deeper when the forward end of said tongue is brought down to the chests of the draft-animals, and a reverse adjustment will have a reverse effect; and, further, that when the tongue is adjusted to effect deeper planting, it will exert a force downward on the runners, and at the same time permit the runners to lower at their rear ends to effect uniform depth of planting in passing over low places.

The machine is combined with a stalk-cutter, as follows: Remove the boxes H, lever F, and bar E, with the attached runners I′, and attach the corn-stalk cutter by substituting the short beam E′ for the beam E. The bar E′ has clevises *t t*, in which the forward ends of the two curved and parallel stalk-cutter frame-bars Q Q are hinged or journaled. The bars Q Q are further steadied by the standards *r r* on the bar D. T is an ordinary cylinder of stalk-cutters, the shaft of which is journaled in the rear ends of the bars Q. R R are levers pivoted at their front ends to the axle of the cutters T, and resting mid-length against guides *u u* and on the axle B, so that they can be tilted to raise the cylinder of cutters, as shown by dotted lines at Fig. 3 of the drawings. S S are two similar parallel bars, fixed to either side and upper part of the frame Q, and by means of which the work of the cutter may be regulated. The levers R and S may both be operated by the driver with his feet.

What I claim as new, and desire to secure by Letters Patent, is—

1. The combination, in a corn-planting machine, of a rear frame carried on wheels, with side bars projecting forward, and a forward frame carrying the seeding devices, pivoted at its forward end to the forward ends of said side bars, with a tongue or draft-pole adjustable vertically upon the rear frame, for the purpose of forcing the runners deeper into the soil, and controlling their depth of penetration, substantially as and for the purpose specified.

2. In a corn-planter, the shoe W, having lugs adapted to act as a support for the bar which carries the driver's seat, and for the fulcrums of the levers to raise and lower the forward frame, substantially as and for the purpose specified.

3. The convertible corn-planter consisting of beams A A, removable beam E, stationary beam D, provided with the uprights *r r* and slotted clevis *d*, carrying the heel of the tongue K, axle B, provided with the guides *u u*, seat-bars Z Z, with shoes W, constructed so as to afford a bearing for the pivot of box-lever F, all arranged and adapted to receive the parallel levers R and foot-bars S, and removable beam E, carrying the rotary corn-stalk cutter, substantially as and for the purpose specified.

In testimony that I claim the foregoing I have hereunto set my hand this 6th day of January, 1879.

ANDREW RUNSTETLER.

Witnesses:
W. J. ENTRIKIN,
FRED POMEROY.